United States Patent [19]

Proctor

[11] Patent Number: 4,739,260
[45] Date of Patent: Apr. 19, 1988

[54] PROXIMITY SENSOR WITH REMOTELY COUPLED OUTPUT

[75] Inventor: Kenneth W. Proctor, Hornchurch, England

[73] Assignee: Schlumberger Electronics (U.K.) Limited, Hants, England

[21] Appl. No.: 747,205

[22] Filed: Jun. 21, 1985

[30] Foreign Application Priority Data

Jun. 23, 1984 [GB] United Kingdom ................ 8416109

[51] Int. Cl.$^4$ .......................... G01B 7/14; H01F 21/02
[52] U.S. Cl. ........................................ 324/208; 336/45
[58] Field of Search ............... 324/207, 208, 173, 174; 336/110, 45, 30; 361/179, 180

[56] References Cited

U.S. PATENT DOCUMENTS

| | | | |
|---|---|---|---|
| 2,532,100 | 11/1950 | Howell | 336/73 |
| 3,876,927 | 4/1975 | Gee et al. | 324/208 |
| 4,382,230 | 5/1983 | Gauthler | 324/207 |
| 4,444,063 | 4/1984 | Snowden et al. | |

Primary Examiner—Reinhard J. Eisenzopf
Assistant Examiner—Walter E. Snow
Attorney, Agent, or Firm—Dale Gaudier

[57] ABSTRACT

A proximity sensor includes an electrical circuit formed by a slot in an elongate conductive strip. The strip carries a magnet having a pole piece protruding through the strip at one end of the slot. At the other end of the slot pass laminations which magnetically couple the electrical circuit and a multi-turn coil arranged on a form attached to the strip. The coil is terminated at a pair of output leads. A ferrous object passing in the vicinity of the pole piece of the magnet modifies the flux pattern at the pole face. The resultant flux changes, being tightly coupled to the electrical strip, induce a low voltage high current emf into the strip, which forms the primary turn of a current transformer. The secondary of the current transformer is formed by the close-coupled coil, which has multiple turns, dependent upon the output voltage required at the output leads. The invention overcomes the problem of providing a proximity sensor which can operate at a high temperature since the conductive strip may be uninsulated, without consequent danger of insulation breakdown, as with prior art multi-turn arrangements.

10 Claims, 5 Drawing Sheets

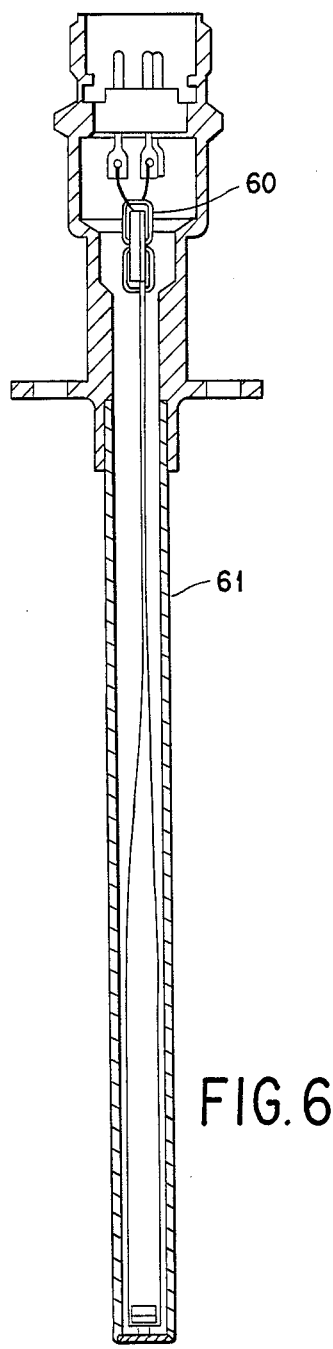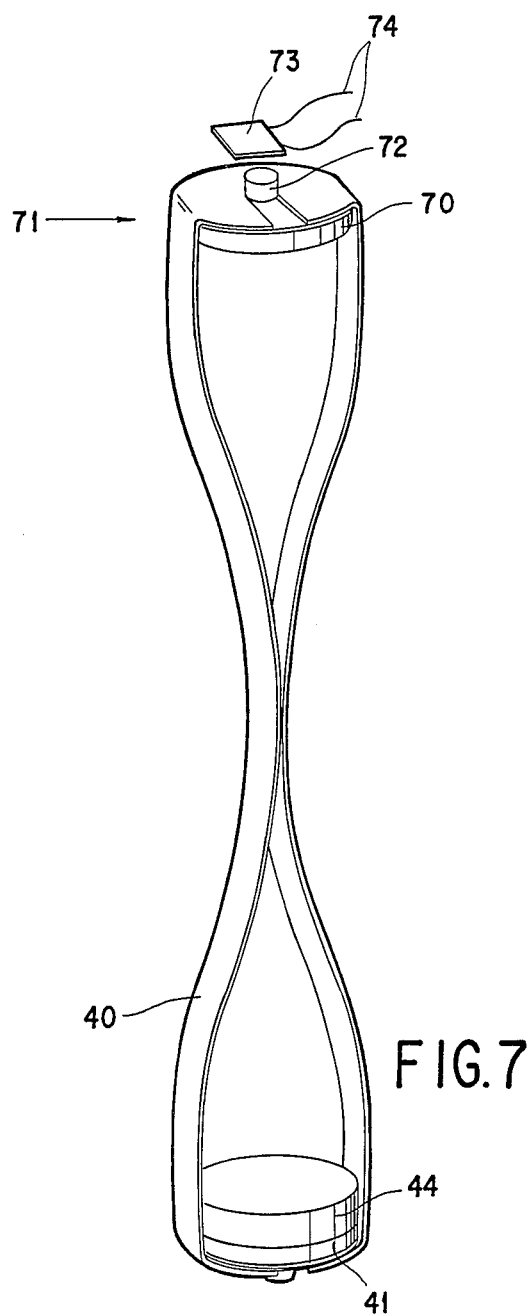

PROXIMITY SENSOR WITH REMOTELY COUPLED OUTPUT

This invention relates to proximity sensors and in particular to sensors for detecting the presence of ferrous objects. A proximity sensor may be used in co-operation with a toothed wheel on a shaft to give an output from which shaft rotational speed may be derived. In such an arrangement, the sensor is placed close to the wheel such that the passing of a tooth may be detected. Another use is in torque measurement wherein a proximity sensor is used to measure the gap between interleaved teeth of a wheel and torque tube. Such an arrangement is described in U.S. Pat. No. 4,444,063.

In the prior art, a proximity sensor comprises a coil disposed around a magnetic pole such that a passing ferrous object induces an output voltage in the coil. In order to provide an output of reasonable level, a coil having many turns is required, and coils having at least 200 turns have been used. The requirement for a large number of turns tends to lead to a bulky sensor, which may be inconveniently large compared with the installation space available. For a multiple output sensor a plurality of coils may be wound about the same pole, which further increases size.

Sensors are often required to be sited in areas of limited space and of high temperature, such as in a gas turbine engine. Since a multi-turn coil is employed, the performance of the interwinding insulation must be adequate over the expected temperature range, else the coil will short and the sensor fail. With the trend to the operation of gas turbines at increasingly high temperatures, it is anticipated that the temperature to which a gas turbine sensor is subjected in use may exceed that at which the performance of the insulation can be guaranteed. Thus conventional sensors may prove unreliable in future engines.

According to the present invention a proximity sensor includes an elongate electrically conductive member arranged to form a closed electrical circuit,
 a magnetically energized pole piece situated at a sensing region of the conductive member such that the member is magnetically coupled to the pole piece surrounding flux pattern,
 and means situated at a remote region of the conductive member for detecting current in the circuit.

In use, movement of a ferrous object in the vicinity of the pole piece will influence the operating flux and induce an electro-motive force (emf) into the conductive member, which will drive a current therethrough. Remote sensing of the current will thus provide an indication of movement proximate the pole piece.

The sensor may operate in high temperature conditions by locating the remote region of the conductive element in an area of lower temperature or where heat may be sunk. Thus various low temperature detectors may be used at the remote region, for example a coupling transformer, which may have a single coil or alternatively multiple coils to provide a multi-output sensor.

Alternatively a magnetically energized second pole may be coupled to the circuit at the remote region. The field surrounding such a field will fluctuate in sympathy with current variation in the circuit. These field fluctions may be detected by, for example a Hall effect detector, a magneto-resistor or by a magneto-optical link.

Magnetic energization may be provided by a permanent magnet contacting or adjusting the pole piece.

In one form of the present invention a single turn circuit is made by forming a slot in a conductive strip. The pole piece may then protrude to one side of the strip through an end of the slot and from a magnet on the other side of the strip.

In an alterative form of the present invention the conductive member may be formed around the pole piece to provide multi-turn coupling, for example by folding a strip member bellows-like over the pole piece such that it protrudes through slots therein.

In order that features and advantages of the present invention may be appreciated an embodiment will now be described by way of example only and with reference to the accompanying diagrammatic drawings of which:

FIG. 6 represents a cased proximity sensor; and

FIG. 7 represents a further alternative embodiment.

Figure 1:
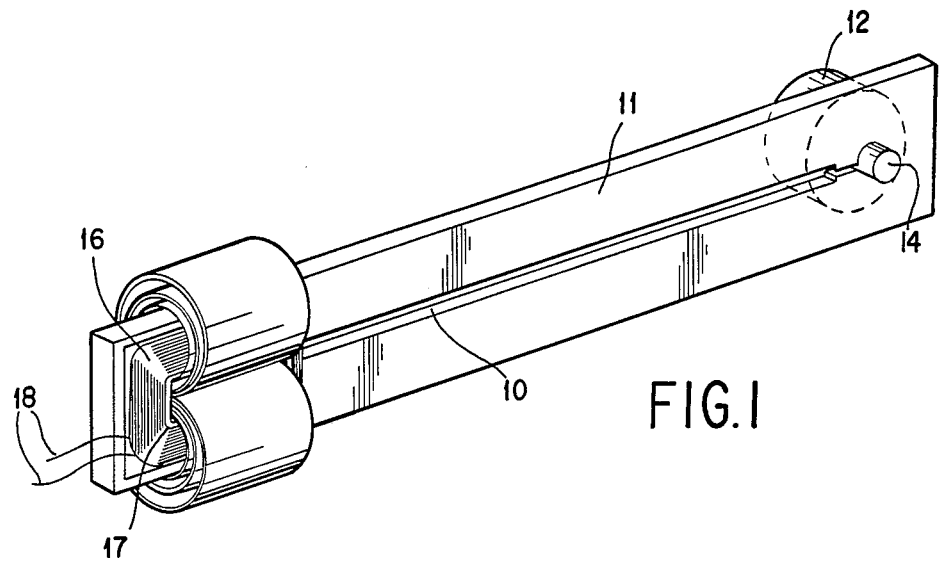
FIGS. 1 and 2 represent a proximity sensor in accordance with the present invention.
Figure 2:
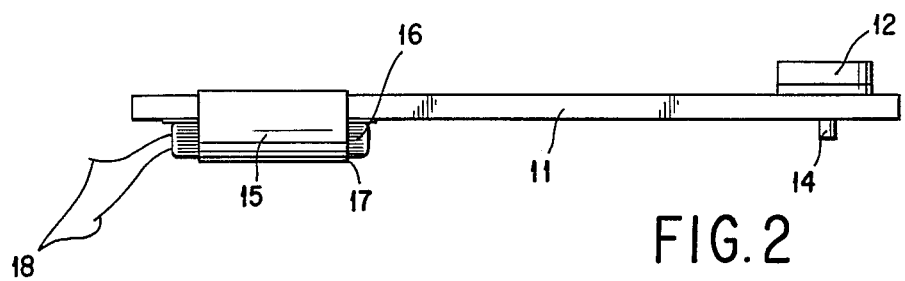

In a proximity sensor (FIGS. 1 and 2) a single turn electrical circuit is formed by a slot 10 in a conductive strip 11. The strip 11 carries a magnet 12 contacting a pole piece 14 protruding through the strip 11 at one end of slot 10. At the other end of the slot 10 pass laminations 15 which magnetically couple the electrical circuit and a multi-turn coil 16 on a former 17 attached to the strip 11. The coil 16 is terminated at an output pair 18.

A ferrous object passing in the vicinity of pole piece 14 modifies the flux pattern at the pole face. The resultant flux changes, being tightly coupled to the electrical conductor 11 induce a low voltage high current emf into the conductor 11, which forms the primary turn of a current transformer. The secondary of the current transformer is formed by the close coupled coil 16, which has multiple turns, dependent upon the output voltage required at output pair 18.

Figure 3:
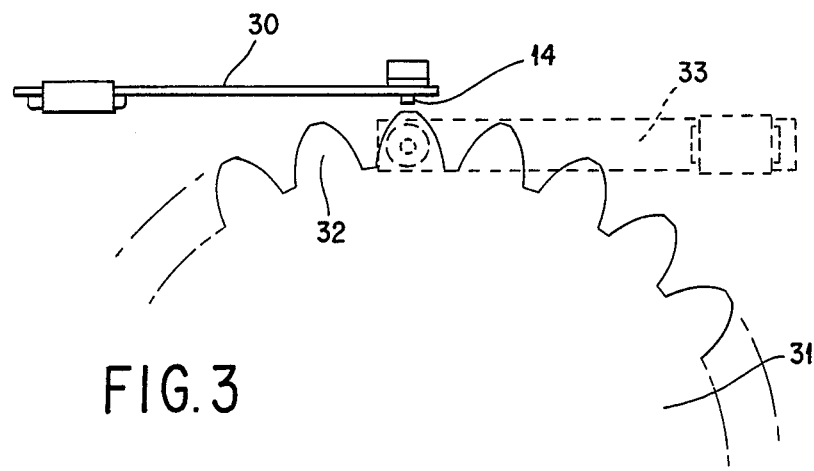
FIG. 3 shows a typical installation of the sensor of FIGS. 1 and 2.

In use, a sensor 30 (FIG. 3) is positioned (by means not shown) adjacent a toothed wheel 31, the rotational speed of which is to be measured. The passage of teeth, such as tooth 32, past pole piece 14 gives rise to an output signal directly related to passing frequency, as hereinbefore described.

In an example of the present invention constructed for use in a high temperature environment, the slotted conductive strip 11 (FIG. 1) which constitutes the primary turn was formed in copper. A high temperature magnet with a soft iron pole piece was used. The secondary was formed of high temperature winding wire (insulation reliable up to 200° C.) with transformer iron laminations. As previously described since the conductive strip 11 may be bare of insulating material, the high temperature performance is extended beyond the point at which normal insulation breaks down. The present example maintains a response at high temperatures provided the site of the secondary coil 16 is maintained at 200° C. or below. This was achieved by elongating the strip 11 such that the coil 16 was at a cooler location.

It will be appreciated that in the present invention a coil is not required on the pole piece at the sensing region, which may therefore be much reduced in size compared with a conventional sensor. Thus the present invention shows great advantage in installation. The dimensions are such that unlike a prior art sensor the passage of the teeth may be sensed from the side, even towards the tooth root (as indicated in phantom 33 of FIG. 3), which can alleviate measurement problems caused by narrow teeth tips, and is more convenient in some installations.

Figure 4:
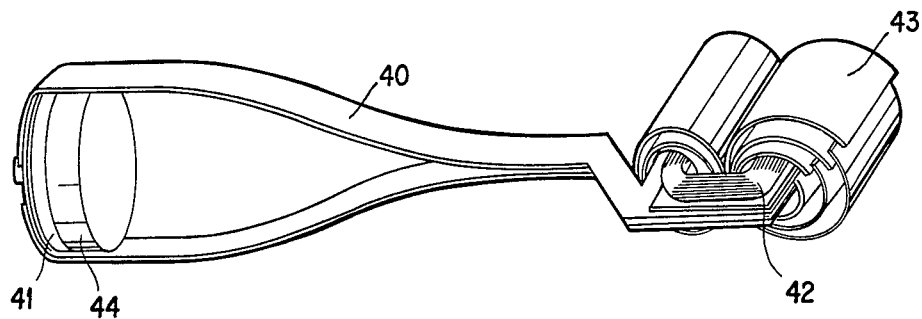
FIG. 4 shows an alternative embodiment of a proximity sensor.
Figure 5:
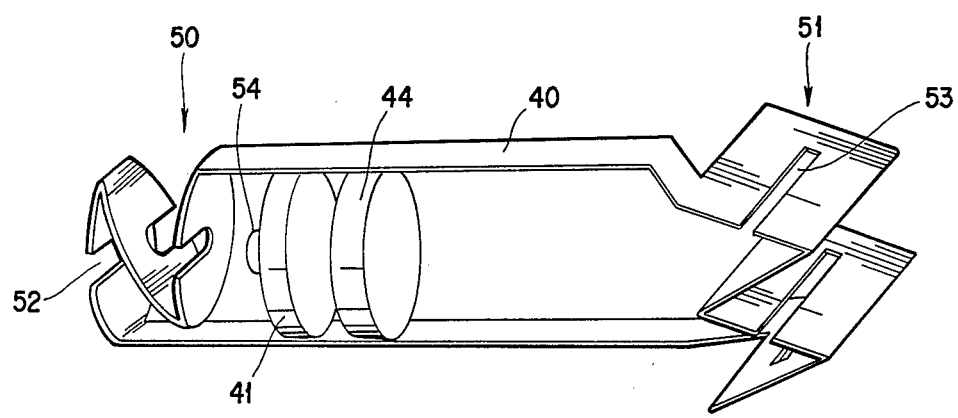
FIG. 5, represents an assembly view of the sensor of FIG. 4.

In an alternative embodiment of the present invention a conductive member 40 (FIG. 4) is formed in the region of a pole piece 41 and pick off coil 42, to provide multi-turn coupling of the closed electrical circuit. The multiple turns are formed (as may be more clearly seen in FIG. 5, in which common reference numerals have been used) by folding the member bellows like in the sensing region 50 and remote region 51. The strip carries slots, such a slots 52 and 53 in the sensing and remote regions respectively to receive the pole piece 41 and laminations 43. It will be appreciated that as the strip is folded down over for example pole piece 41 a stack of three air spaced half turns is formed around pole face portion 54.

Magnetic energisation is provided by permanent magnet 44.

This latter embodiment of the invention presents a number of advantages. In particular magnetic coupling is promoted by virtue of the multiple turns. Further, the arrangement is readily adapted to be mounted in a cylindrical case, as is preferred for sensors to be installed in gas turbine engines. For example a member 60 (FIG. 6) may be readily mounted in a closed cylindrical stainless steel case 61, which constitutes a conventional engine proximity probe case. Furthermore, conductive member 40 may be straightforwardly fabricated by stamping, from a single sheet, folding and joining.

As an alternative to coil pick off, a yet further embodiment of the present invention (FIG. 7, bearing common reference numerals with FIG. 4) employs a secondary pole piece 70 at a remote region 71. When current flows in conductive member 40 by virtue of induced emf as hereinbefore described, the flux pattern surrounding pole piece protrusion 72 will fluctuate in sympathy therewith. This fluctuation is detected by Hall effect detector 73 to provide a sensor output at terminations 74.

What is claimed is:

1. A proximity sensor comprising:
   an elongate electrically conductive member arranged to form a closed electrical circuit;
   a stationary magnetized pole piece producing a first magnetic flux pattern situated at a sensing region of the conductive member at one end thereof such that the member surrounding the pole piece and is magnetically coupled to said first flux pattern surrounding the pole piece by at least one turn therethrough;
   said first flux pattern being influenced by the presence of a ferrous object proximate the sensing region such that movement of said object causes current flow in said circuit;
   said member being arranged such that a second flux pattern is established at an opposite end of said electrically conductive member, remote from said sensing region, by virtue of said current; and
   means situated at said remote region for sensing changes in said second flux pattern.

2. A proximity sensor as claimed in claim 1 wherein the pole piece is magnetically energized by a permanent magnet.

3. A proximity sensor as claimed in claim 1 wherein the conductive member is uninsulated.

4. A proximity sensor as claimed in claim 1 wherein the conductive member comprises a single turn.

5. A proximity sensor as claimed in claim 1 wherein the conductive member comprises a slotted strip.

6. A proximity sensor as claimed in claim 5 wherein the pole piece protrudes to one side of the strip through an end of the slot and from a magnet on the other side of the strip.

7. A proximity sensor as claimed in claim 1 wherein at least the sensing region of the conductive member is formed having multiple adjacent turns to provide multiple turn coupling with the pole piece.

8. A proximity sensor as claimed in claim 1 wherein the means for sensing changes in said second flux pattern includes at least one multi-turn secondary coil magnetically coupled to the circuit.

9. A proximity sensor as claimed in claim 1 wherein the means for sensing changes in said second flux pattern includes an additional pole piece coupled to the circuit and means for detecting field fluctuations around the additional pole piece.

10. A proximity sensor as claimed in claim 9 wherein the means for detecting field fluctuations around the additional pole piece is a Hall-effect detector.

* * * * *